United States Patent
Pieraccini (10) Patent No.: US 11,150,334 B2
(45) Date of Patent: Oct. 19, 2021

(54) BISTATIC INTERFEROMETRIC TERRESTRIAL RADAR WITH TRANSPONDER

(71) Applicant: UNIVERSITA' DEGLI STUDI DI FIRENZE, Florence (IT)

(72) Inventor: Massimiliano Pieraccini, Florence (IT)

(73) Assignee: UNIVERSITA' DEGLI STUDI DI FIRENZE, Florence (IT)

( * ) Notice: Subject to any disclaimer, the term of this patent is extended or adjusted under 35 U.S.C. 154(b) by 295 days.

(21) Appl. No.: 16/341,621

(22) PCT Filed: Oct. 10, 2017

(86) PCT No.: PCT/IB2017/001238
§ 371 (c)(1),
(2) Date: Apr. 12, 2019

(87) PCT Pub. No.: WO2018/069760
PCT Pub. Date: Apr. 19, 2018

(65) Prior Publication Data
US 2020/0379097 A1    Dec. 3, 2020

(30) Foreign Application Priority Data
Oct. 13, 2016    (IT) .................. 102016000102764

(51) Int. Cl.
*G01S 13/00* (2006.01)
*G01S 13/90* (2006.01)
(52) U.S. Cl.
CPC ........ *G01S 13/003* (2013.01); *G01S 13/9023* (2013.01); *G01S 13/9058* (2019.05)

(58) Field of Classification Search
CPC . G01S 13/003; G01S 13/9058; G01S 13/9023
(Continued)

(56) References Cited

U.S. PATENT DOCUMENTS 4,128,839 A * 12/1978 McComas ............. G01S 13/003
                                                      342/32
4,163,231 A *  7/1979 Zuerndorfer ........ G01S 13/9058
                                                      342/25 A
(Continued)

FOREIGN PATENT DOCUMENTS

EP      0249493 A2 * 12/1987  ........... G01S 13/933
EP      2392943 A1 * 12/2011  ........... G01S 13/865
(Continued)

OTHER PUBLICATIONS

D. Mecatti, D. Dei, M. Fratini, F. Parrini, M. Pieraccini, F. Coppi, "A novel ground based multi bistatic radar for interferometric measurement of displacement vector", Geoscience and Remote Sensing Symposium (IGARSS), 2011 IEEE International, pp. 3983-3986.

(Continued)

*Primary Examiner* — Vladimir Magloire
*Assistant Examiner* — Nuzhat Pervin
(74) *Attorney, Agent, or Firm* — McGlew and Tuttle, P.C.

(57) ABSTRACT

Bistatic interferometric terrestrial radar comprising: a main radar unit (2) provided with ground fixing means (6) and provided with at least one transmitting unit (3) and at least one receiving unit (4); at least one amplifier transponder (5, 50) placed far away from said main unit (2), provided with ground fixing means (9) and provided with a receiving antenna (7) and a transmitting antenna (11).

13 Claims, 8 Drawing Sheets

(58) Field of Classification Search
USPC .......................................................... 342/156
See application file for complete search history.

(56) References Cited

U.S. PATENT DOCUMENTS

| | | | | | |
|---|---|---|---|---|---|
| 4,839,656 | A | * | 6/1989 | O'Neill | G01S 13/78 342/33 |
| 4,965,586 | A | * | 10/1990 | O'Neill | G01S 13/78 342/357.33 |
| 5,065,160 | A | * | 11/1991 | Kawakami | G01S 13/767 342/51 |
| 5,070,334 | A | * | 12/1991 | Commissaire | G01S 7/0234 342/43 |
| 5,448,243 | A | * | 9/1995 | Bethke | G01S 13/931 342/59 |
| 5,826,819 | A | * | 10/1998 | Oxford | F41G 7/303 244/3.14 |
| 6,114,984 | A | * | 9/2000 | McNiff | F41G 7/303 342/146 |
| 6,181,270 | B1 | * | 1/2001 | Dwyer | G01S 13/904 342/25 R |
| 6,724,340 | B1 | * | 4/2004 | Carlos | G01S 7/2813 342/22 |
| 6,864,828 | B1 | * | 3/2005 | Golubiewski | G01S 13/9054 342/25 C |
| 7,619,554 | B2 | * | 11/2009 | Shklarsky | G01S 13/003 342/180 |
| 8,203,486 | B1 | * | 6/2012 | Smith | G01S 5/06 342/452 |
| 8,373,591 | B2 | * | 2/2013 | Margolin | G01S 13/003 342/146 |
| 2002/0135505 | A1 | * | 9/2002 | Klausing | G01S 13/74 342/25 R |
| 2005/0219115 | A1 | * | 10/2005 | Herberthson | G01S 13/53 342/90 |
| 2006/0163422 | A1 | * | 7/2006 | Krikorian | F41G 7/303 244/3.14 |
| 2009/0051585 | A1 | * | 2/2009 | Krikorian | G01S 7/4026 342/25 A |
| 2011/0248882 | A1 | * | 10/2011 | Coppi | G01S 13/32 342/156 |
| 2014/0225761 | A1 | * | 8/2014 | Garrec | G01S 13/913 342/33 |
| 2014/0241239 | A1 | * | 8/2014 | Chang | H04B 7/18504 370/316 |

FOREIGN PATENT DOCUMENTS

| | | | | |
|---|---|---|---|---|
| EP | 2406660 | B1 | * 12/2013 | ............ G01S 13/003 |
| FR | 2942884 | A1 | * 9/2010 | ............ G01S 13/003 |
| GB | 2165413 | A | * 4/1986 | ............ G01S 13/90 |
| GB | 2261344 | A | * 5/1993 | ............ G01S 13/767 |
| JP | 09189762 | A | * 7/1997 | |
| WO | WO-2006129306 | A2 | * 12/2006 | ............ G01S 13/003 |
| WO | WO-2010102945 | A1 | * 9/2010 | ............ G01S 13/003 |

OTHER PUBLICATIONS

M. Pieraccini, D. Tarchi. H. Rudolf, D. Leva, G. Luzi, C. Atzeni, "Interferometric radar for remote monitoring of building deformations", Electronics Letters, vol. 36, No. 6, pp. 569-570 (2000).

* cited by examiner

BISTATIC INTERFEROMETRIC TERRESTRIAL RADAR WITH TRANSPONDER

FIELD OF THE INVENTION

The invention relates to an interferometric radar and in particular an interferometric terrestrial radar of the type used for the remote sensing of landslides, mines, glaciers, avalanches, volcanoes, as well as for detecting movements of large structures such as bridges, dams and building works in general.

STATE OF THE ART

A solution is known wherein a bistatic interferometric radar, as described in D. Mecatti, D. Dei, M. Fratini, F. Parrini, M. Pieraccini, F. Coppi, "A novel ground based multi bistatic radar for interferometric measurement of displacement vector." In: Geoscience and Remote Sensing Symposium (IGARSS), 2011 IEEE International (pp. 3983-3986) is able to measure two components of a target displacement.

In this solution, a main radar unit with an on-board transmitter and receiver is provided. The radar signal is irradiated by the main transmission antenna or by one of the two secondary remote antennas that illuminate the same target and are connected to the main unit by RF wiring.

This known solution has some significant drawbacks, due to the need to connect the remote antennas via a cable, which makes it difficult to apply the system to real cases when it is necessary to place or move the secondary antennas at different points of observation, which can also be dozens or hundreds of meters away.

Moreover, within the scope of displacement measurement systems, this solution is not satisfactory because it is unable to provide bidimensional radar images, displacement maps and elevation maps (DEM: Digital Elevation Map) of the visual field.

A technology called GB-SAR (Ground based Synthetic Aperture Radar) is also known, in which a monostatic interferometric radar moves along a mechanical guide to achieve the so-called synthetic opening. In this way, radar images of the visual field are realized and, by means of differential interferometry, it is also possible to measure the displacements of targets. Such technology is of particular interest because it is a radar technique that can provide high-precision displacement maps over an entire field of observation. An example of a conventional GB-SAR is described in M. Pieraccini, D. Tarchi. H. Rudolf, D. Leva, G. Luzi, C. Atzeni, "Interferometric radar for remote monitoring of building deformations", *Electronics Letters, Vol.* 36, no. 6, pp. 569-570 (2000).

However, GB-SAR systems of the known type have considerable limits as they only detect target displacement along the view direction and not the displacement vector of the side or of the architectural structure observed.

OBJECT OF THE INVENTION

The object of the present invention is therefore to propose a bistatic interferometric terrestrial radar free from the above-mentioned drawbacks of the known-type systems and able to measure 2 or more components of the displacement of a target to be monitored, such as a side or other structure.

SUMMARY OF THE INVENTION

These and other objects have been achieved with an interferometric terrestrial radar according to one or more of the appended claims, with a main radar unit having a transmitting antenna and a receiving antenna which acquires a first (monostatic) image of its visual field, and which, by using a further receiving antenna (or a rotation of the first receiving antenna), acquires a second (bistatic) image of the same scenario by exploiting the rebound of a signal from an amplifier transponder.

A first advantage of the invention is that the proposed radar is able to obtain radar images taken from multiple points of observation and, by means of differential interferometry, is also able to measure the displacements of targets.

A second advantage is that the interferometric radar of the invention is able to obtain the displacement map in multiple components and, with appropriate arrangements, also the elevation map of the visual field (DEM).

Another advantage is that the radar has a simplified structure with respect to the known solutions of satellite or airplane bistatic radars.

LIST OF DRAWINGS

These and other advantages will be better understood by anyone skilled in the art from the description below and the accompanying drawings, given as a non-limiting example, wherein.

DETAILED DESCRIPTION

Figure 1:
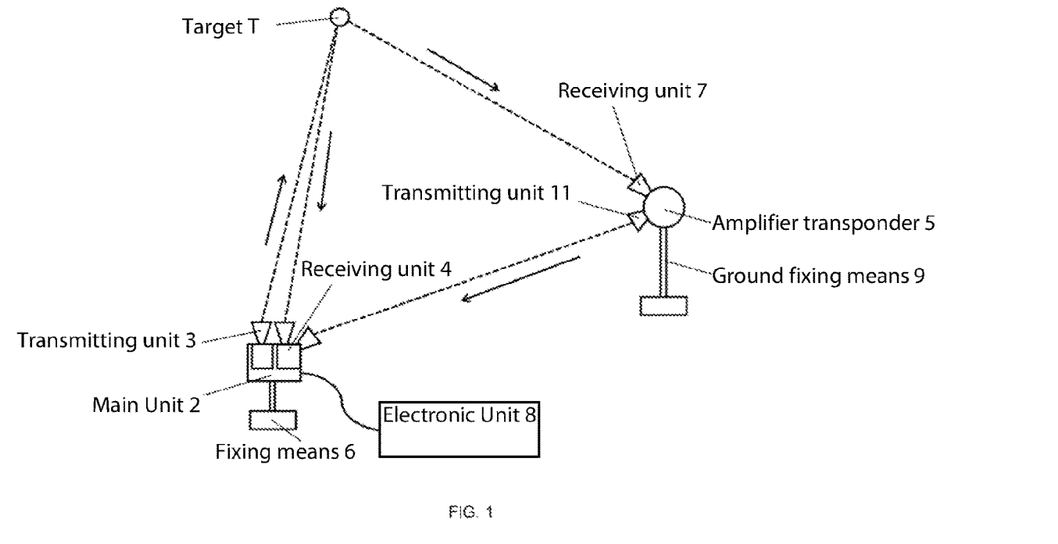
FIG. 1 shows a first embodiment of a radar according to the invention.

With reference to the accompanying drawings, FIG. 1 shows a first embodiment, FIGS. 2-6 illustrate a preferred embodiment of the radar of the invention.

Figure 2:
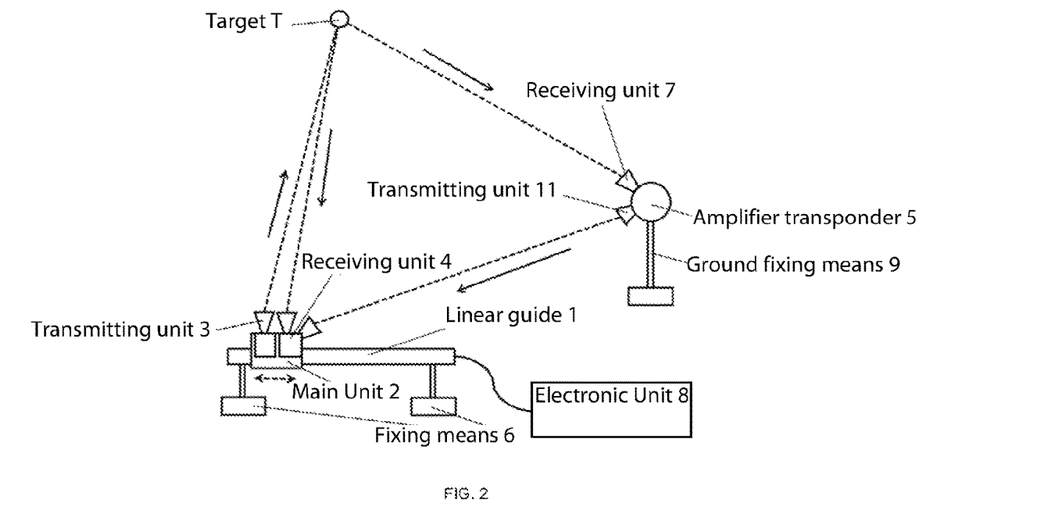
FIG. 2 shows a preferred example of a radar according to the invention.
Figure 3:
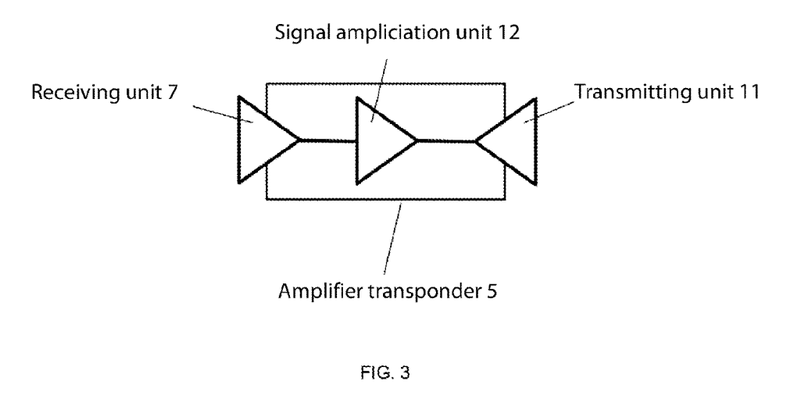
FIG. 3 shows a scheme of an amplifier transponder which can be used in the radar of the invention.

In the preferred example, the radar is a bistatic interferometric terrestrial radar of the synthetic opening type comprising a movement system, e.g. a straight linear guide 1 provided with ground fixing means 6 on which a main radar unit 2 having at least a first transmitting unit 3 and a receiving unit 4 can slide; the latter must be able to acquire, simultaneously or at different times, from at least two different directions. This can be accomplished in several ways: through two antennas and a single acquisition channel; through two antennas and two separate acquisition channels; through a single antenna able to rotate and a single acquisition channel.

The radar further comprises an amplifier transponder 5 placed far away from said main unit 2, e.g. at a distance between 10 m and 500 m, provided with ground fixing means 9, with a signal amplification unit 12 and further provided, in turn, with a receiving unit 7 and a transmitting unit 11.

According to the invention, the transmitting unit 3 and the receiving unit 4 of the main radar unit are respectively arranged to transmit and receive a signal towards and from a target T to be monitored. Furthermore, the receiving unit 4 is arranged to also receive from the amplifier transponder 5.

In the amplifier transponder 5, the receiving unit 7 and the transmitting unit 11 are, in turn, oriented to receive a radar signal from the target T to be monitored and to transmit towards the main unit 2, respectively.

For the acquisition and processing of the radar signals, an electronic unit 8 connected to the main radar unit 2 is provided.

During operation, the electronic unit 8 acquires a monostatic synthetic radar image of target T by exploiting the main unit movement along the guide 1.

Subsequently or simultaneously, the unit 8 acquires a bistatic synthetic radar image of target T by exploiting the main unit movement along the guide 1 and using the amplifier transponder.

Figure 4:
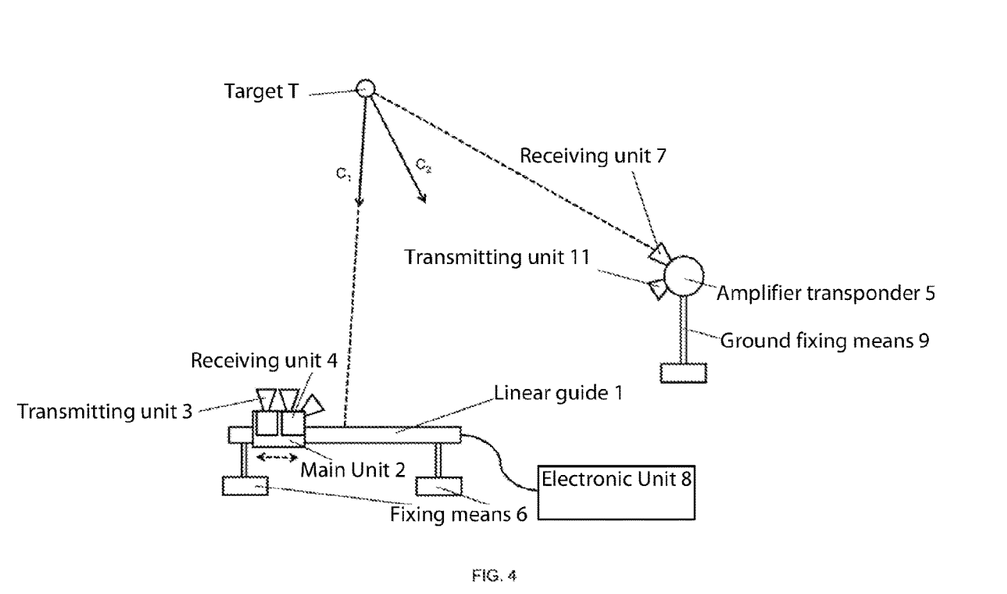
FIG. 4 schematically shows the operation of the radar of FIG. 2 by highlighting the two components of the displacement ($c_1$ and $c_2$) which can be detected by the radar.

Thanks to the invention, by means of the radar signal bouncing through the transponder 5, it is possible to realize a bistatic synthetic image of the scenery in the visual field of the radar head transmission antenna and of the transponder receiving antenna. From the synthetic image, by means of per se known methods of radar interferometry, it is possible to measure the $c_1$ component of the displacement in the direction between radar and target and a second displacement component $c_2$ in the direction of the bisector between radar—target and target—transponder, thus obtaining at least two components (FIG. 4).

Figure 13:
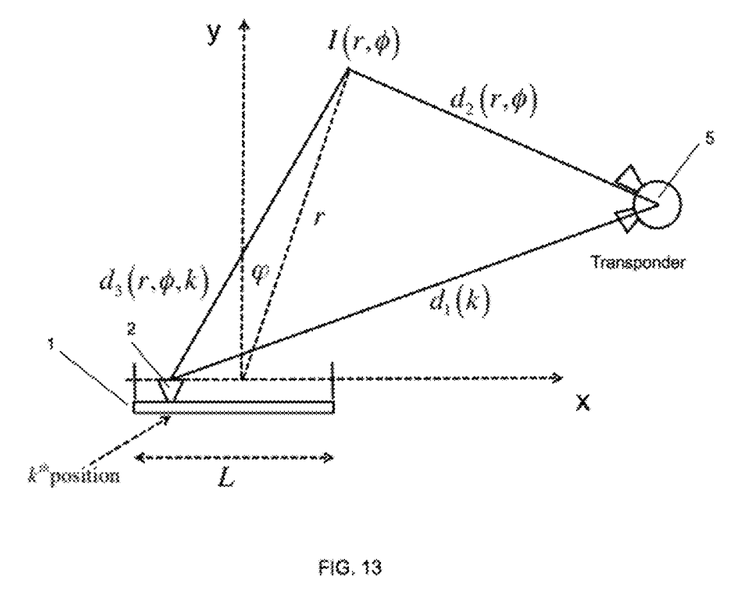
FIG. 13 shows the general geometry of an algorithm for the synthesis of bistatic images using the linear scan radar.
Figure 14:
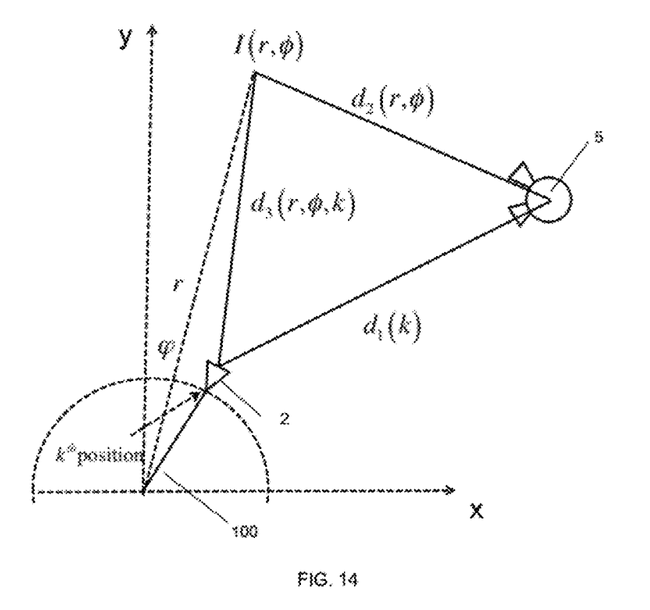
FIG. 14 shows the general geometry of an algorithm for the synthesis of bistatic images using the movement radar along a circumferential arc.
Figure 15:
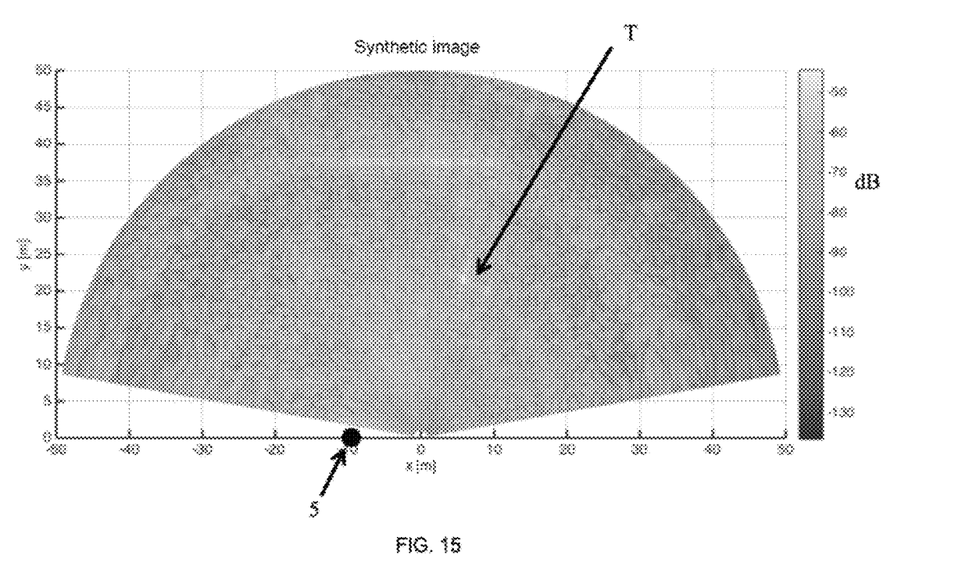
FIG. 15 shows a bistatic synthetic radar image of a target acquired by the radar of the invention.

Preferably, the unit 8 processes the second synthetic radar image of target T by means of an algorithm having as parameters at least the position of the main unit 2 along the guide 1, the distance $d_1$ between the main unit 2 and the amplifier transponder 5, the distance $d_2$ between the amplifier transponder 5 and the target T and the distance $d_3$ between the main unit 2 and the target T. In more detail, with reference to the general geometry shown in FIGS. 13 and 14, the result of a measurement is a matrix $N_f \times N_p$ of complex numbers $$E_{i,k} = I_{i,k} + jQ_{i,k}$$

where $I_{i,k}$ and $Q_{i,k}$ are the in-phase and in-quadrature components acquired at the $i^{th}$ frequency $f_i$ ($1 \le i \le N_f$) in the $k^{th}$ position along the guide ($1 \le k \le N_p$). Synthesizing the image in a generic point identified by the polar coordinates $(r, \phi)$ means compensating for the path phase among an image generic point, the amplifier transponder 5 and the radar unit 2.

With reference to FIGS. 13 and 14, the base formula is:

$$I(r, \phi) = \frac{1}{N_f N_p} \sum_{i,k} E_{i,k} e^{j\frac{2\pi}{c} f_i (R(r, \phi, k))}$$

with $$R(r, \phi, k) = d_1(k) + d_2(r, \phi) + d_3(r, \phi, k)$$

and where:
c is the speed of light
$d_1(k)$ is the distance between the transponder and the $k^{th}$ position of the radar unit 2 along the guide 1,
$d_2(r, \phi)$ is the distance between the observed target of coordinates $(r, \phi)$ and the transponder 5,
$d_3(r, \phi, k)$ is the distance between the observed target of coordinates $(r, \phi)$ and the $k^{th}$ position of the radar unit 2 along the guide 1.

In an exemplary embodiment of the of the radar schematized in FIGS. 2 and 4,
the transmitting unit 3 of the main unit 2 comprises an antenna oriented to transmit a signal towards said target T,
the receiving unit 4 of the main unit 2 comprises an antenna oriented to receive a signal from said target T and an antenna to receive a signal from said amplifier transponder 5,
the receiving unit 7 of the amplifier transponder 5 comprises an antenna oriented to receive a signal from said target T, and
the transmitting unit 11 of the transponder unit 7 comprises an antenna oriented to transmit the signal towards said main unit 2.

In this case (FIG. 4), the radar measures the displacement component $c_1$ of the target T along the direction between target and radar, and the displacement component $c_2$ of the target T along the bisector direction between the radar—target T and target T—amplifier transponder directions.

Figure 5:
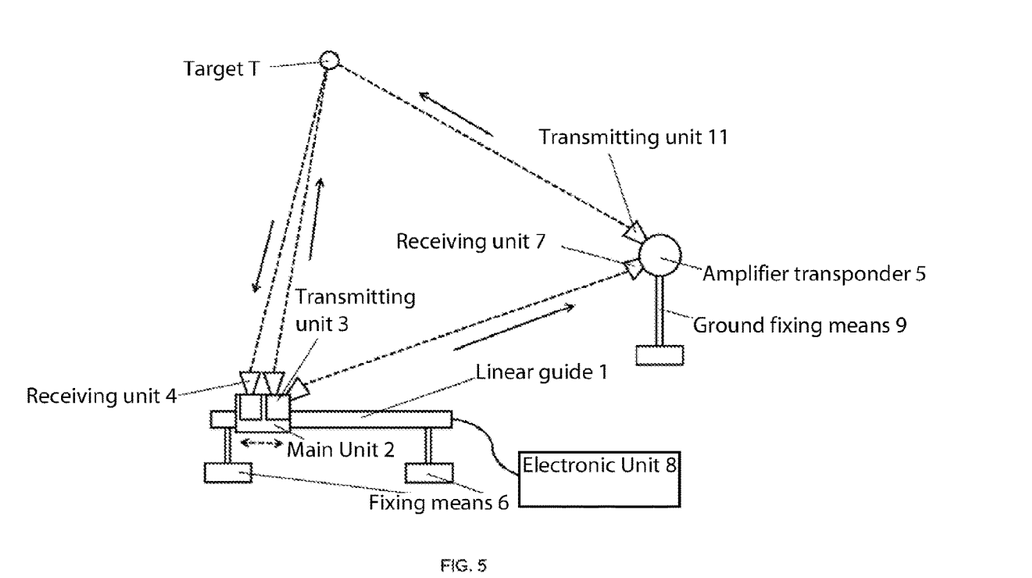
FIG. 5 shows an alternative embodiment, still equivalent to the one shown in FIG. 2.

In a further embodiment schematized in FIG. 5:
the receiving unit 4 of the main unit 2 comprises an antenna oriented to receive a signal from said target T,
the transmitting unit 3 of the main unit 2 comprises an antenna oriented to transmit a signal towards said target T and an antenna to transmit a signal towards the amplifier transponder 5,
the receiving unit 7 of the amplifier transponder 5 comprises an antenna oriented to receive a signal from said main unit 2,
the transmitting unit 11 of the amplifier transponder 7 comprises an antenna oriented to transmit the signal towards said target T.

Also in this case the radar measures the displacement component $c_1$ of the target T along the direction between target and radar, and the displacement component $c_2$ of the target T along the bisector direction between the radar—target T and target T—amplifier transponder directions.

Figure 6:
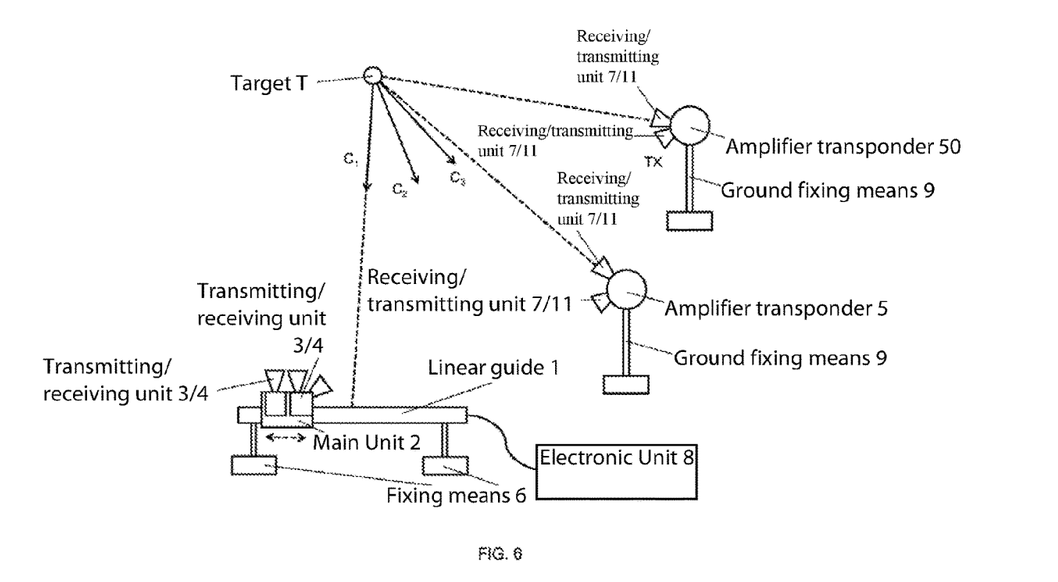
FIG. 6 schematically shows the operation of an additional embodiment able to acquire more than two displacement components.

In a further embodiment schematized in FIG. 6, the radar comprises a second transponder unit 50.

In this case the radar measures
the displacement component $c_1$ of the target T along the direction between target and radar,
the displacement component $c_2$ of the target T along the bisector direction between radar—target T and target T—first amplifier transponder 5, and the displacement component $c_3$ of the target T along the bisector direction between the directions radar—target T and target T—second amplifier transponder 50.

Advantageously, in case of use of multiple transponders, if the amplifier transponders are at different heights, by means of at least two amplifier transponders it is possible to obtain the three components in the displacement vector space (x, y, z).

Figure 7:
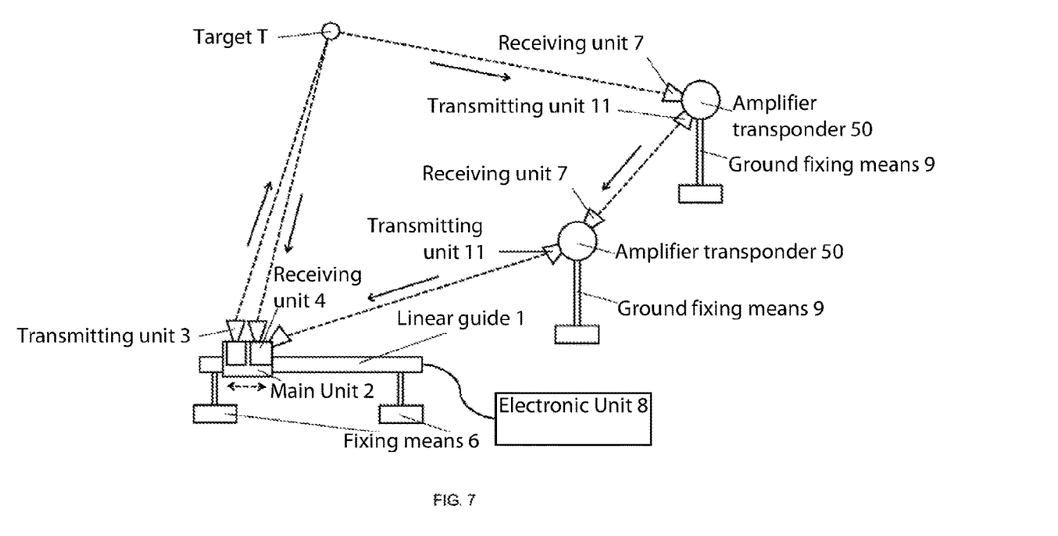
FIG. 7 shows a further embodiment which can be used when the second point of observation is not with a view of the main unit or too far from the main unit 2.

In a further embodiment schematized in FIG. 7, the radar comprises a second amplifier transponder 50.

In this case the transmitting unit 3 comprises an antenna oriented to transmit a signal towards the target T, the receiving unit 4 comprises an antenna oriented to receive a signal from said target T and an antenna to receive a signal from the first amplifier transponder 5, the receiving unit 7 of the first amplifier transponder 5 comprises an antenna oriented to receive the signal from the second amplifier transponder 50, the transmitting unit 11 of the first amplifier transponder 5 comprises an antenna oriented to transmit the signal towards the main unit 2, the receiving unit 7 of the second amplifier transponder 50 comprises an antenna oriented to receive a signal from the target T, the transmitting unit 11 of the second amplifier transponder 50 comprises an antenna oriented to transmit the signal towards the first amplifier transponder 5.

Advantageously, in the case of use of multiple transponders arranged as in FIG. 7, if the radar and a transponder with a view of the target do not have a view free from obstacles, or they are too far to get a good signal, it is possible to use another transponder which acts as a sort of radio link.

Figure 8:
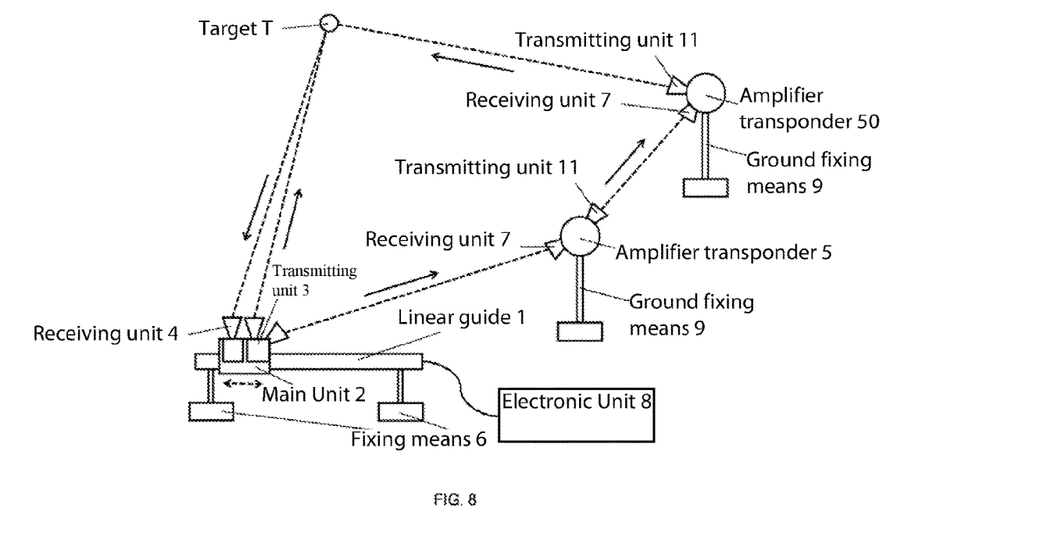
FIG. 8 shows a further embodiment equivalent to the one shown in FIG. 7, but with a reversed path of the radar signal.

In a further embodiment, schematized in FIG. 8, the radar signal path is reverse with respect to the embodiment described above.

Figure 9:
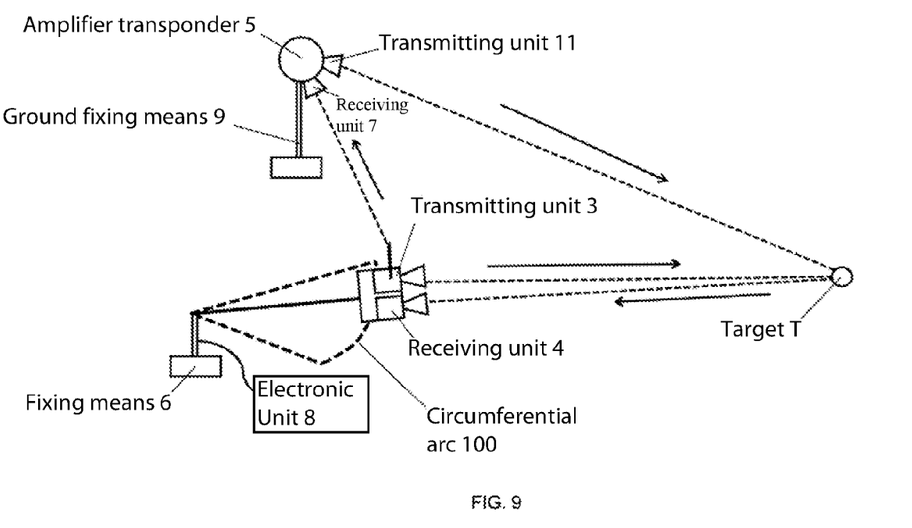
FIG. 9 shows a further embodiment based on a movement system along a circle arc (100)
Figure 10:
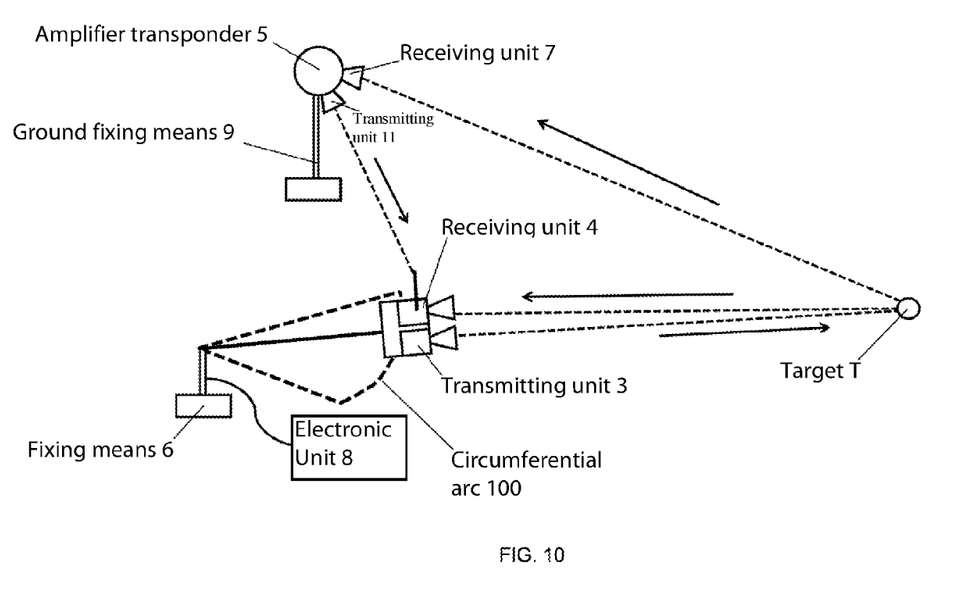
FIG. 10 shows an alternative embodiment, still equivalent to the one shown in FIG. 9.

Referring to FIGS. 9-10, a radar according to the invention is shown, in which the movement system of the main unit 2 is a rotating arm on a circumferential arc 100.

In such embodiment, the antenna connecting the unit 3 to the amplifier transponder 5 will preferably be of the omnidirectional type.

Figure 11:
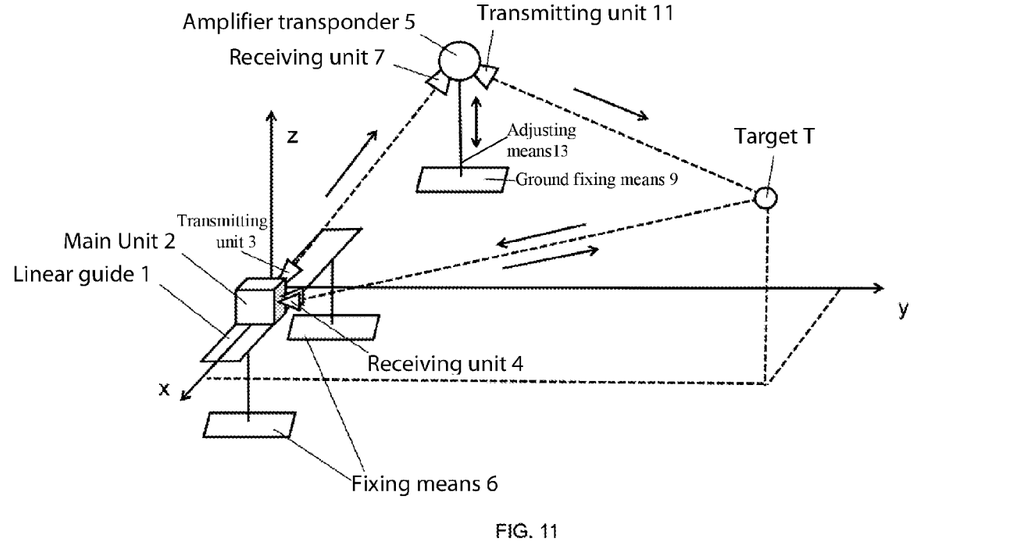
FIG. 11 schematically shows an embodiment of a radar according to the invention which allows DEM acquisition of the visual field.

In FIG. 11a further embodiment example is shown, in which the ground fixing means 9 of the amplifier transponder comprise height adjustment means 13.

Advantageously, in this case, the radar of the invention can also be used to get the target altitude in the visual field, i.e. DEM (Digital Elevation Model). With reference to FIG. 11, two bistatic measurements are in fact performed, which differ only because the transponder has been moved at a certain height (e.g. raised or lowered).

From the interferogram between the two images, it is thus possible to obtain the heights of the target in the field of observation of the radar.

Figure 12:
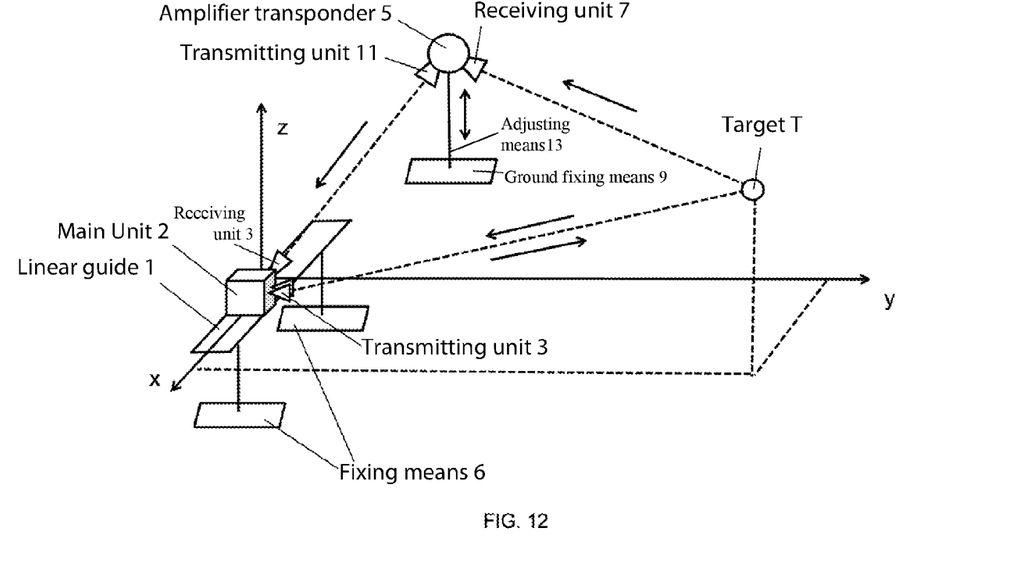
FIG. 12 shows an alternative embodiment, still equivalent to the one shown in FIG. 11.

FIG. 12 shows an embodiment equivalent to the one shown in FIG. 11.

The present invention has been described according to preferred embodiments; however, equivalent variants can be conceived without departing from the scope of the present invention.

The invention claimed is:

1. A bistatic interferometric terrestrial radar comprising:
a main radar unit provided with a ground fixing means and provided with at least one first transmitting unit and at least one first receiving unit;
at least one amplifier transponder placed away from said main unit, provided with a ground fixing means and said at least one amplifier transponder being provided with a second receiving unit and a second transmitting unit, said at least one first transmitting unit and said at least one first receiving unit respectively being arranged to transmit and receive a signal towards and from a target to be monitored or said at least one amplifier transponder, said second receiving unit and said second transmitting unit being respectively arranged to receive and transmit a signal towards and from said target to be monitored or said main radar unit; and
an acquisition and processing unit of radar signals operatively connected to said main radar unit to acquire in succession or simultaneously at least one monostatic radar image obtained by using said signal received from said target, at least one bistatic radar image of said target obtained by using said signal passing through said at least one amplifier transponder, and to process said at least one monostatic image and said at least one bistatic image by interferometry to measure two components of displacement of said target corresponding to said monostatic and bistatic images.

2. The bistatic interferometric terrestrial radar according to claim 1, further comprising a movement system of said main radar unit, wherein said acquisition and processing unit of radar signals acquires in succession or simultaneously at least one monostatic synthetic radar image of said target realized by exploiting movement of said main radar unit and at least one bistatic synthetic radar image of said target realized by exploiting said movement of said main radar unit and using said signal which passes through said at least one amplifier transponder to process said at least one bistatic synthetic radar image and said at least one monostatic synthetic image by interferometry to measure two components of said displacement of said target corresponding to said at least one bistatic synthetic radar image and said at least one monostatic synthetic radar image.

3. The bistatic interferometric terrestrial radar according to claim 2, wherein said movement system of said main radar unit comprises a straight guide.

4. The bistatic interferometric terrestrial radar according to claim 2, wherein said movement system comprises a circumferential arc guide.

5. The bistatic interferometric terrestrial radar according to claim 2, wherein said acquisition and processing unit processes said at least one bistatic radar image of said target by an algorithm having at least a distance between said main radar unit and said at least one amplifier transponder, a distance between said at least one amplifier transponder and said target, and a distance between said main radar unit and said target.

6. The bistatic interferometric terrestrial radar according to claim 1, wherein said first receiving unit of said main radar unit comprises an antenna oriented to receive a signal from said target and an antenna to receive a signal from said at least one amplifier transponder, said at least one first transmitting unit of said main radar unit comprising an antenna oriented to transmit a signal towards said target, said second receiving unit of said at least one amplifier transponder comprising an antenna oriented to receive a signal from said target, said second transmitting unit of said at least one amplifier transponder comprising an antenna oriented to transmit said signal towards said main radar unit.

7. The bistatic interferometric terrestrial radar Rada according to claim 1, wherein said at least one first receiving unit of said main radar unit comprises an antenna oriented to receive a signal from said target, said at least one first transmitting unit of said main radar unit comprising an antenna oriented to transmit a signal towards said target and an antenna to transmit a signal towards said at least one amplifier transponder, said second receiving unit of said at least one amplifier transponder comprising an antenna oriented to receive a signal from said main radar unit, said second transmitting unit of said amplifier transponder comprising an antenna oriented to transmit said signal towards said target.

8. The bistatic interferometric terrestrial radar according to claim 1, wherein said at least one amplifier transponder comprises a first transponder unit and a second transponder unit, wherein said at least one first receiving unit of said main radar unit comprises an antenna oriented to receive a signal from said target and an antenna to receive a signal from said first transponder unit, said at least one first transmitting unit of said main radar unit comprising an antenna oriented to transmit a signal towards said target, and wherein in said first transponder unit, said second receiving unit comprises an antenna oriented to receive a signal from said second transponder unit, said second transmitting unit comprising an antenna oriented to transmit said signal towards said main radar unit, and wherein in said second transponder unit said second receiving unit comprises an antenna oriented to receive a signal from said target, said second transmitting unit comprising an antenna oriented to transmit said signal towards said first transponder unit.

9. The bistatic interferometric terrestrial radar according to claim 1, further comprising a reversed path of a bistatic signal, said reversed path comprising a radar signal proceeding from said main radar unit to said at least one amplifier transponder, from said at least one amplifier transponder to said target and from target to said main radar unit.

10. The bistatic interferometric terrestrial radar according to claim 1, wherein at least one of said at least one first receiving unit and said at least one said first transmitting unit of said main radar unit comprises an orientable antenna to be alternately oriented toward said target or said at least one amplifier transponder.

11. The bistatic interferometric terrestrial radar according to claim 1, wherein said ground fixing means of said at least one amplifier transponder comprises a height adjustment means of said at least one amplifier transponder.

12. A method for measuring displacements of a target by a bistatic interferometric terrestrial radar, the method comprising:

providing a main radar unit provided with a ground fixing means and provided with at least one first transmitting unit and at least one first receiving unit;

providing at least one amplifier transponder placed away from said main radar unit, said at least one amplifier transponder being provided with a ground fixing means and provided with a second receiving unit and a second transmitting unit, said at least one first transmitting unit and said at least one first receiving unit being respectively arranged to transmit and receive a signal towards and from a target to be monitored or said at least one amplifier transponder, said second receiving unit and said second transmitting unit being respectively arranged to receive and transmit a signal towards and from said target to be monitored or said main radar unit; and providing an acquisition and processing unit operatively connected to said main radar unit, wherein said acquisition and processing unit performs a phase of:

acquisition, in succession or simultaneously, of at least one monostatic radar image of said target and at least one bistatic radar image of said target realized using said signal which passes through said at least one amplifier transponder; and an interferometric processing phase of said at least one bistatic radar image and said at least one monostatic radar image to measure at least two components of displacement of said target corresponding to said at least one monostatic radar image and said at least one bistatic radar image.

13. The method according to claim 12, wherein said main radar unit is movable by a movement system and said acquisition and processing unit performs an acquisition phase, in succession or simultaneously, of at least one monostatic synthetic radar image of said target realized by exploiting movement of said main radar unit and at least one bistatic synthetic radar image of said target realized by exploiting said movement of said main radar unit and using said signal passing through said at least one amplifier transponder, and said acquisition and processing unit performs an interferometric processing phase of said at least one bistatic synthetic radar image and said at least one monostatic synthetic radar image to measure said at least two components of said displacement of said target corresponding to said at least one monostatic synthetic radar image and said at least one bistatic synthetic radar image.

* * * * *